Jan. 5, 1971  P. A. WEBER  3,553,535

SWITCHING CIRCUIT

Filed Feb. 19, 1968

INVENTOR.
PAUL A. WEBER
BY Franklin D. Jankosky
ATTORNEY.

United States Patent Office 3,553,535
Patented Jan. 5, 1971

---

3,553,535
SWITCHING CIRCUIT
Paul A. Weber, Freiburg, Breisgau, Germany, assignor to Fritz Hellige & Co. G.m.b.H., Freiburg im Breisgau, Germany
Filed Feb. 19, 1968, Ser. No. 706,440
Claims priority, application Germany, Feb. 19, 1968, H 61,906
Int. Cl. H01h 47/32
U.S. Cl. 317—148.5
3 Claims

ABSTRACT OF THE DISCLOSURE

A switching circuit for controlling alternating current relays or direct current relays utilizing a controlled current-rectifier in series with a parallel arrangement of a holding choke and a diode. A pulsating direct current source is utilized to ignite the controlled current-rectifier and a parallel circuit of the holding choke and diode cooperates with the controlled current-rectifier to ensure that the rectifier is conductive during certain short term intervals, such as interruptions of the ignition voltage or when the current would tend to fall below the threshold value.

FIELD OF THE INVENTION

This invention relates to a switching circuit and more particularly to a novel switching circuit for controlling alternating current relays or direct current relays.

DESCRIPTION OF THE PRIOR ART

Switching circuits for controlling alternating current relays or direct current relays are well known. Controlled current-rectifiers such as, thyratrons or thyristors, have been the heart of such switching circuits. Normally, such circuitry is controlled by means of a direct voltage or by means of ignition pulses being synchronized to the chief voltage source. In the latter case, so called gate-controlling is obtained, so that a current will flow only during certain time intervals of the half-waves of the alternating current. It is obvious that such synchronization involves a somewhat complex and expensive arrangement as well as a somewhat unreliable switching circuit.

Accordingly, it is an object of the present invention to provide a novel switching circuit which is relatively simple and inexpensive.

It is a further object of the present invention to provide a novel switching circuit that is reliable.

It is a still further object of the present invention to provide a novel switching circuit that permits the controlled current-rectifier to be conductive after interruption of the ignition voltage.

It is another object of the present invention to provide a novel switching circuit wherein a holding choke and diode arrangement is utilized to ensure that the threshold voltage is maintained until the next wave cycle.

SUMMARY OF THE INVENTION

In accordance with the objects set forth above, the present invention provides a switching circuit for alternating current relays or direct current relays wherein a parallel arrangement of a holding choke and a diode is connected in series to a controlled current-rectifier to ensure conduction of the rectifier. The holding choke maintains magnetic energy sufficient to supply a substitute current to the controlled current-rectifier to ensure its conduction during short term intervals. The diode is inserted in parallel to the holding choke in its low-resistance direction to ensure that the voltage drop across the choke prevents saturation of the choke.

BRIEF DESCRIPTION OF THE DRAWINGS

Additional objects, advantages, and characteristic features of the present invention will become readily apparent from the following detailed description of preferred embodiments of the invention when taken in conjunction with the accompanying drawings in which.

DESCRIPTION OF THE PREFERRED EMBODIMENTS

Figure 1:
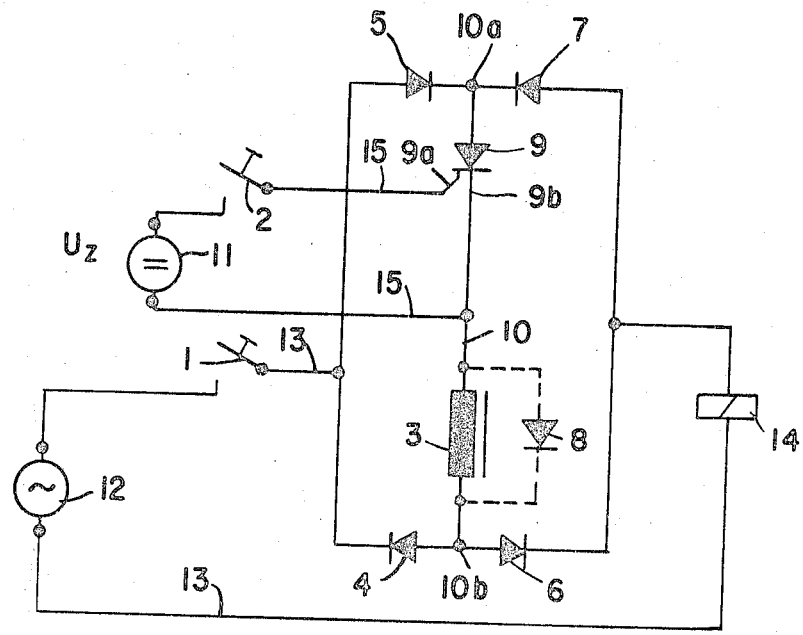
FIG. 1 is a schematic of a switching circuit for controlling an alternating current relay in accordance with the present invention.

Referring now to FIG. 1, there is shown one of the embodiments of a switching circuit in accordance with the principles of this invention. In this circuit, an alternating current source 12 supplies the current to a load circuit line 13 containing as a load, an alternating current relay 14. A switch 1 is an on-off switch for applying the current from the alternating current switch 12 to the load circuit line 13. The switching circuit further contains a full-wave rectifier of the well known Graetz-circuit type. The Graetz-circuit comprises the diodes 4, 5, 6 and 7. One diagonal of this circuit is the load circuit line 13 in which an alternating current is flowing. A second diagonal of this circuit is a diagonal 10 in which a pulsating direct current may flow. The diagonal 10 includes a controlled current-rectifier 9, which may be a thyratron or a thyristor. As is well known, a controlled current-rectifier of the type mentioned must be ignited in order to conduct.

The igniting circuit comprises a controlling source 11 for obtaining ignition signals for the controlled current-rectifier 9, an igniting switch 2, and a controlling circuit line 15. The positive terminal of the controlling source 11 is connected with the ignition or controlling-electrode 9a of the controlled current-rectifier 9. The negative terminal of the controlling source 11 is connected with the electrode 9b, or with that electrode which is negative in respect to the low-resistance direction of the controlled current-rectifier 9. The controlled current-rectifier 9 will remain conductive as long as sufficiently high positive ignition voltage $U_z$ is applied across the controlling circuit line 15. If the ignition voltage is interrupted, the controlled current-rectifier 9 will remain conductive only until the alternating current of the load circuit passes through zero. It may even already be interrupted, if after the interruption of the ignition voltage, the current is below a certain threshold value, the so-called stop current.

In order to maintain the conduction of the controlled current-rectifier 9, an inductance in the form of a holding choke 3 is inserted in the diagonal line 10 so that the holding choke 3 is in series with the controlled current-rectifier 9.

In the operation of the switching circuit, during the period after the controlled current-rectifier 9 is ignited, magnetic energy will be induced into the holding choke 3. During the period when the alternating current source 12 is passing through zero, the inductive current in the holding choke 3 will flow in the original current direction. This substitute current will be applied to the controlled-current rectifier 9 through the diodes 4 and 5 or 6 and 7 of the Graetz-circuit. By calculating the current necessary to maintain the induced current greater than the threshold value of the stop current until the next half-wave of current arriving from the alternating current source 11, a suitable holding choke may be selected so as to be utilized to prohibit the non-conduction of the controlled current-rectifier 9. Therefore, as long as the load circuit line 13 is not interrupted by the switch 1, the controlled current-rectifier 9 will remain in its conductive state after being ignited for the first time, thus, the alternating current relay 14 will remain in its energized state.

In selecting a suitable holding choke, it should be noted that commonly only a small portion of the current of the load circuit 13 is necessary as stop current, for example, only a portion of one percent; therefore, the required magnetic energy is small and the holding choke 3 may be relatively small. Additionally, the holding choke 3 together with the diagonal line 10 of the Graetz-circuit and the controlled current-rectifier 9 forms the chief current line; therefore, the voltage drop across the holding choke 3 should not very great. It would economical to dimension the holding choke 3 together with its iron core in such a manner that the latter will be transferred in its saturated state already with small current values. Generally for this requirement, the iron core of the choke may be constructed out of common transformal-sheet-iron. The remanence may also be kept small by means of an air-gap.

The switching circuit in accordance with the present invention includes a diode 8, inserted in parallel with the holding choke 3 in its low-resistance direction. The diode serves to ensure that the voltage drop across the choke will only increase up to the value of the lock-votlage of the diode 8. At this value, the induction of the choke shall not yet have reached saturation, but its ohmic resistance shall have a value that with a lock-voltage of approximately .7 volts for a silicon-thyristor, a sufficient magnetizing current is flowing. During the period when the holding choke 3 is supplying current to the controlled current-rectifier 9, the diode 8 is switched in its high-resistance direction and therefore has no further influence on this current.

Figure 2:
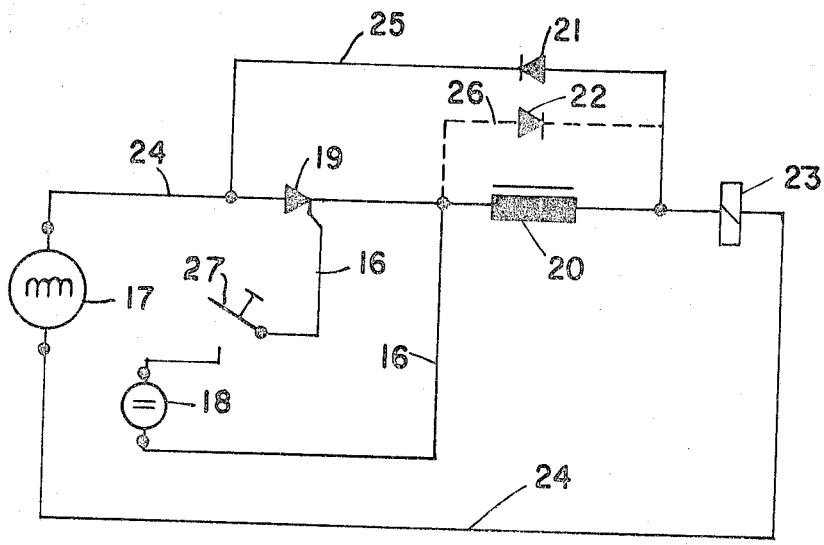
FIG. 2 is a schematic of a switching circuit for controlling a direct current relay in accordance with the present invention.

Referring now to FIG. 2, there is shown another embodiment of a switching circuit in accordance with the principles of this invention. The circuit of FIG. 2 is simplified compared with the circuit of FIG. 1 insofar as it is presumed that a source 17 of a load circuit line 24 is already supplying pulsating direct current for energizing the direct current relay 23. The igniting circuit comprises a controlling source 18 for obtaining ignition signals for a controlled current-rectifier 19, an igniting switch 27, and a controlling circuit line 16. The positive terminal of the controlling source 18 is connected with the ignition or controlling-electrode of a controlled current-rectifier 19. The negative terminal of the controlling source 18 is connected with the electrode which is negative in respect to the low-resistance direction of the controlled current-rectifier 19.

During the phases intermediate to the current pulses, a holding choke 20, owing to its inductivity, is supplying a sufficiently high substitute current in the same direction, which is flowing back to the rectifier 19 and to the choke 20 via a diode 21 and a parallel line 25. A suitable holding choke 20 may be selected as described in the description of FIG. 1. A current line 26 which is lying parallel to the holding choke 20 contains a diode 22, inserted in its low-resistance direction for the load current is limiting the voltage drop across the holding choke 20 to a small value, as already described in the operation of which was previously described in connection with FIG. 1.

By means of the switching circuits in accordance with the principles of this invention, the contactless controlling of relay switches may be perfected to the extent, that once after a controlled current-rectifier is ignited, the relay switches may be kept in their energized state. It is necessary in many applications that the relay switches are reliable, for example, in connection with the controlling of the defibrillators for the artificial resuscitation of the heart activity by means of electrical current-pulses. For such a case and other cases of use, it is a special advantage of the controlling circuit in accordance with the principles of this invention, that the controlled current-rectifier, owing to the substitute current supplied by a holding choke, will remain conductive if the normal current supply is interrupted in any unforeseen manner for short time intervals, for example, by any interference. It is noted that such interferences are not seldom, for example, they may be produced by cushioning at the switch contacts.

Thus, although the present invention has been shown and described with reference to particular embodiments, nevertheless, various changes and modifications obvious to a person skilled in the art to which the invention pertains are deemed to lie within the spirit, scope, and contemplation of the invention as set forth in the appended claims.

What is claimed is:

1. A switching circuit for controlling pulsating direct current comprising:
    (a) a controlled current rectifier;
    (b) igniting means for triggering said controlled current rectifier into conduction;
    (c) a holding choke serially connected with said controlled current rectifier;
    (d) a full-wave rectifier having an input and an output;
    (e) an electrical source connected to the input of the full-wave rectifier, said full-wave rectifier connected in parallel with the output of said controlled current rectifier and said holding choke and providing a pulsating direct-current to said controlled current rectifier;
    (f) a diode connected in parallel with said holding choke, said diode biased to conduct current in same direction as said controlled current rectifier, said diode limiting the voltage drop across said holding choke; and
    (g) inductive relay means serially connected as a load between said electrical source and said full-wave rectifier.

2. The switching circuit of claim 1 wherein said electrical source is an alternating current source, said controlled current rectifier comprises a thyristor having anode, cathode and gate electrodes, and said igniting means comprises a controlled current source and an on/off switch cooperating with two electrodes of said thyristor for igniting said thyristor.

3. The switching circuit of claim 1 wherein said electrical source is a pulsating direct current source and said controlled current rectifier comprises a thyratron having anode, cathode and grid electrodes, and said igniting means comprising a controlled current source and an on/off switch cooperating with two electrodes of said thyratron for igniting said thyratron.

References Cited

UNITED STATES PATENTS

| 3,241,044 | 3/1966 | Mills | 323—22 |
| 3,315,135 | 4/1967 | Thiele | 317—148.5 |
| 3,243,605 | 3/1966 | Smith et al. | 307—252 |
| 3,206,615 | 9/1965 | La Pointe | 307—252 |
| 3,147,419 | 9/1964 | Cope | 318—129 |
| 3,201,597 | 8/1964 | Balan | 307—252 |
| 3,172,019 | 3/1965 | Ragonese | 317—148.5 |
| 3,244,965 | 4/1966 | Gutzwiller | 323—22 |
| 3,407,840 | 10/1968 | Finnegan | 137—392 |
| 3,371,227 | 2/1968 | Sylvan | 307—252 |

LEE T. HIX, Primary Examiner

C. L. YATES, Assistant Examiner

U.S. Cl. X.R.

307—252; 317—156